United States Patent [19]

Ogatsu et al.

[11] Patent Number: 5,724,442
[45] Date of Patent: Mar. 3, 1998

[54] APPARATUS FOR PROCESSING INPUT COLOR IMAGE DATA TO GENERATE OUTPUT COLOR IMAGE DATA WITHIN AN OUTPUT COLOR REPRODUCTION RANGE

[75] Inventors: Hitoshi Ogatsu; Shinji Kita, both of Kanagawa, Japan

[73] Assignee: Fuji Xerox Co., Ltd., Tokyo, Japan

[21] Appl. No.: 426,019

[22] Filed: Apr. 19, 1995

[30] Foreign Application Priority Data

Jun. 15, 1994 [JP] Japan ............. 6-133260

[51] Int. Cl.$^6$ ............. G03F 3/08; H04N 1/46
[52] U.S. Cl. ............. 382/167; 358/518; 358/523; 358/520; 382/162; 382/166
[58] Field of Search ............. 358/518, 523, 358/520, 504, 525; 395/109; 382/162, 166, 167

[56] References Cited

U.S. PATENT DOCUMENTS

| | | | |
|---|---|---|---|
| 4,500,919 | 2/1985 | Schreiber | 358/518 |
| 4,758,885 | 7/1988 | Sasaki et al. | 358/520 |
| 4,941,038 | 7/1990 | Walowit | 358/518 |
| 5,185,661 | 2/1993 | Ng | 358/515 |
| 5,268,753 | 12/1993 | Yamaguchi | 358/527 |
| 5,319,473 | 6/1994 | Harrington | 358/523 |
| 5,434,683 | 7/1995 | Sekine et al. | 358/520 |
| 5,594,558 | 1/1997 | Usami et al. | 358/518 |

*Primary Examiner*—Kim Vu
*Assistant Examiner*—Tia M. Harris
*Attorney, Agent, or Firm*—Finnegan, Henderson, Farabow, Garrett & Dunner, L.L.P.

[57] ABSTRACT

Binary data corresponding to respective lattice point data addresses of a direct look-up table and indicating an inside or outside of a color reproduction range of an output device are retained. Based on the binary data, a judgment is made of whether an input color signal is located inside or outside the color reproduction range of the output device. A lattice point data address that is generated from the input color signal is compressed based on a result of the above judgment. The judging and compressing operations are repeated to generate lattice point data addresses so that they are located inside the color reproduction range of the output device.

5 Claims, 8 Drawing Sheets

BEFORE LIGHTNESS COMPRESSION

AFTER LIGHTNESS COMPRESSION

| LATTICE POINT ADDRESS | DATA OF COMPRESSION DIRECTION TABLE | LATTICE POINT DATA | | | |
|---|---|---|---|---|---|
| 0001 | F1  2 bits | Y1  8 bits | M1  8 bits | C1  8 bits | K1  8 bits |
| 0002 | F2  2 bits | Y2  8 bits | M2  8 bits | C2  8 bits | K2  8 bits |
| ⋮ | | | | | |
| i | Fi  2 bits | Yi  8 bits | Mi  8 bits | Ci  8 bits | Ki  8 bits |

FIG. 11

| LATTICE POINT ADDRESS | | LATTICE POINT DATA | | | |
|---|---|---|---|---|---|
| 0001 | | Y1 8 bits | M1 8 bits | C1 8 bits | K1 8 bits |
| 0002 | | Y2 8 bits | M2 8 bits | C2 8 bits | K2 8 bits |
| ⋮ | | ⋮ | | | |
| i | | Yi 8 bits | Mi 8 bits | Ci 8 bits | Ki 8 bits |

FIG. 12

| LATTICE POINT ADDRESS | COLOR REPRODUCTION RANGE JUDGING FLAG BITS | LATTICE POINT DATA | | | |
|---|---|---|---|---|---|
| 0001 | F1 1 bit | Y1 8 bits | M1 8 bits | C1 8 bits | K1 8 bits |
| 0002 | F2 1 bit | Y2 8 bits | M2 8 bits | C2 8 bits | K2 8 bits |
| ⋮ | ⋮ | ⋮ | | | |
| i | Fi 1 bit | Yi 8 bits | Mi 8 bits | Ci 8 bits | Ki 8 bits |

APPARATUS FOR PROCESSING INPUT COLOR IMAGE DATA TO GENERATE OUTPUT COLOR IMAGE DATA WITHIN AN OUTPUT COLOR REPRODUCTION RANGE

BACKGROUND OF THE INVENTION

1. Field of the Invention

The present invention relates to a color image processing apparatus and, more particularly, to a color image processing apparatus which is used as an image integrated processing apparatus or the like, such as a digital full-color printer, a color facsimile machine, a color copier, a desk-top publishing apparatus, in which an input color image is subjected to image processing and then reproduced on a display or a recording medium.

2. Description of the Prior Art

U.S. Pat. No. 4,500,919 discloses a system which has a judging means for judging whether the color reproduction range of an input color image is wider than the color reproduction range of an output device, and which can provide an operator with color reproduction range inside/outside information. This function is hereinafter referred to as gamut alarming. The operator can surely recognize the relationship between the two color reproduction ranges from this gamut alarming, and obtain an output image that satisfies his preference by performing a color adjustment by using such means as an editing means.

Further, a method in which a judging means for judging whether or not the color reproduction range of an input color image is wider than the color reproduction range of an output device is used, and if it is wider, the input image is compressed and a non-deformed and good image is output, is created. For example, the Japanese Unexamined Patent Publication No. 4-277978 discloses a method in which after an input BGR image is converted to L*a*b* color signals, the lightness and chromaticity are respectively judged in a color reproduction range judging section and compression is performed in the lightness or chroma direction based on the judgment result.

FIG. 13 is a diagram explaining a problem of chroma deterioration due to compression in the chroma direction. When the chroma is uniformly compressed with the lightness kept constant in the L*a*b* color space, or when the clipping onto the outermost portion of the color reproduction range is performed in the chroma direction with the lightness kept constant in the L*a*b* color space, a remarkable chroma deterioration may occur as shown in FIG. 13. This phenomenon occurs particularly in and near the yellow region where the chroma varies mainly in the L*a*b* color space while the lightness varies little. Therefore, it is preferable to change the projection direction of the input image L*a*b* in accordance with its position in the color space. To perform the above compression or clipping stricty, it is preferable to recognize the three-dimensional shape of the boundary of the color reproduction range and find a nearest point on the boundary under a restrictive condition of constant hue. However, a cumbersome procedure is required to do so.

SUMMARY OF THE INVENTION

The present invention has been made to solve the above problems, and has an object of providing a color image processing apparatus capable of reproducing a preferable image by changing the projection direction of an input image L*a*b* in accordance with its position in a color space.

To attain the above object, according to the invention, there is provided a color image processing apparatus that performs, on an input color signal, a color conversion suitable for an output device by using a direct look-up table, comprising:

judging means having binary data that correspond to respective lattice point data addresses of the direct look-up table and indicate an inside or outside of a color reproduction range of the output device, for judging whether the input color signal is located inside or outside the color reproduction range of the output device based on the binary data; and compressing means for compressing a lattice point data address that is generated from the input color signal based on a judgment result of the judging means, wherein the judgment by the judging means and the compression by the compressing means are repeated to generate lattice point data addresses so that they are located inside the color reproduction range of the output device.

With the above constitution, the projection direction of an input image L*a*b* can be changed in accordance with its position in a color space, whereby a good output image can be obtained from an input color image signal.

BRIEF DESCRIPTION OF THE DRAWINGS

FIGS. 11 and 12 show structures of direct look-up tables (DLUTs); and

DESCRIPTION OF THE PREFERRED EMBODIMENTS

Embodiment 1

Figure 1:
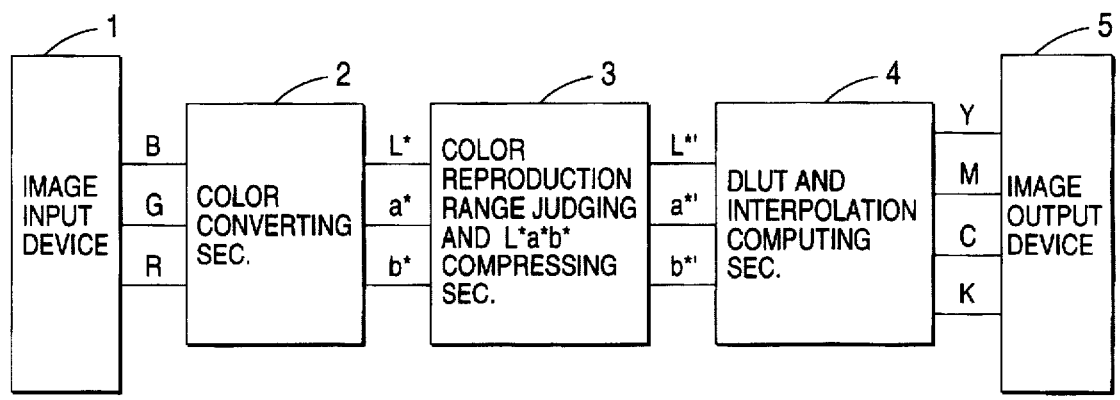
FIG. 1 is a block diagram showing an image processing apparatus according to a first embodiment of the present invention.
Figure 2:
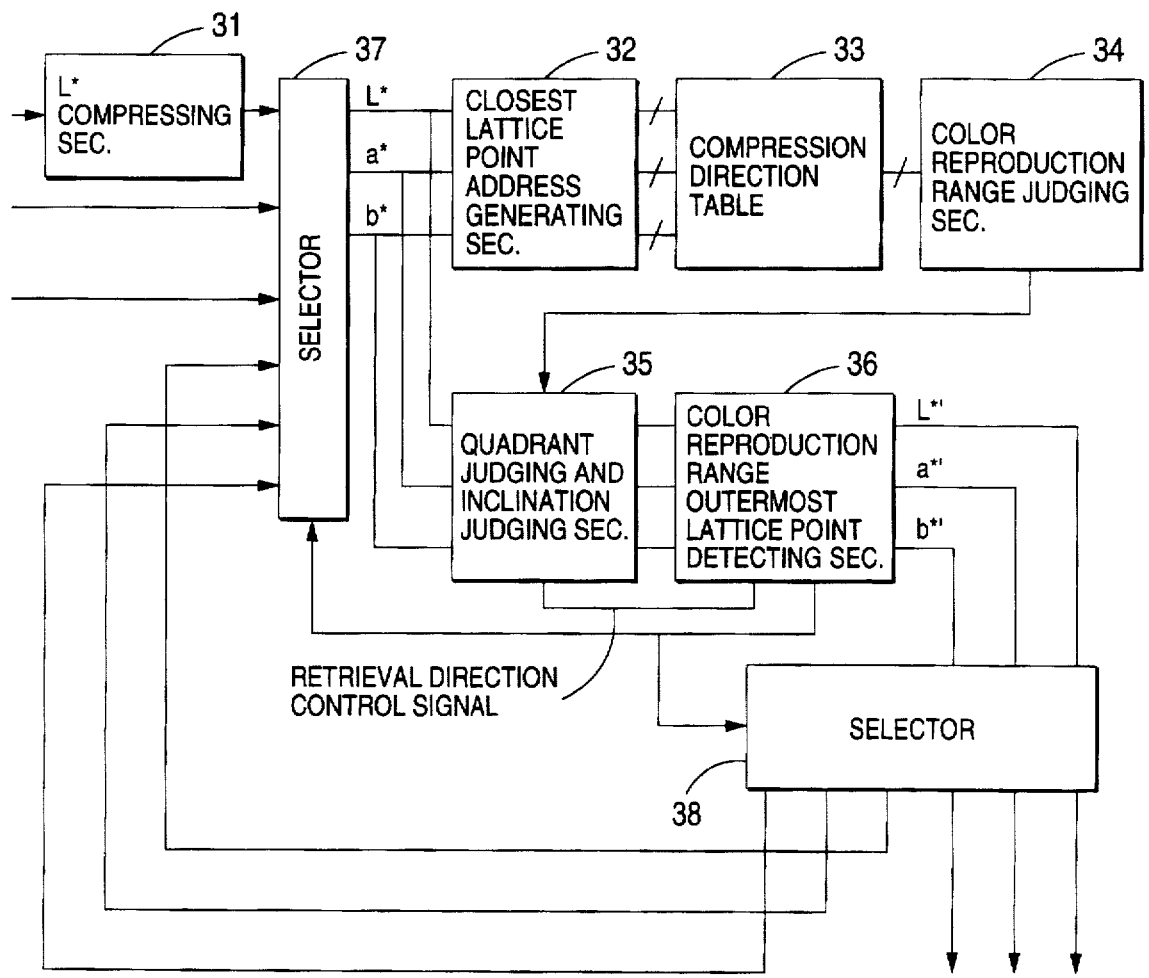
FIG. 2 is a block diagram showing a configuration of a color reproduction range judging and L*a*b* compressing section.
Figures 3, 4:
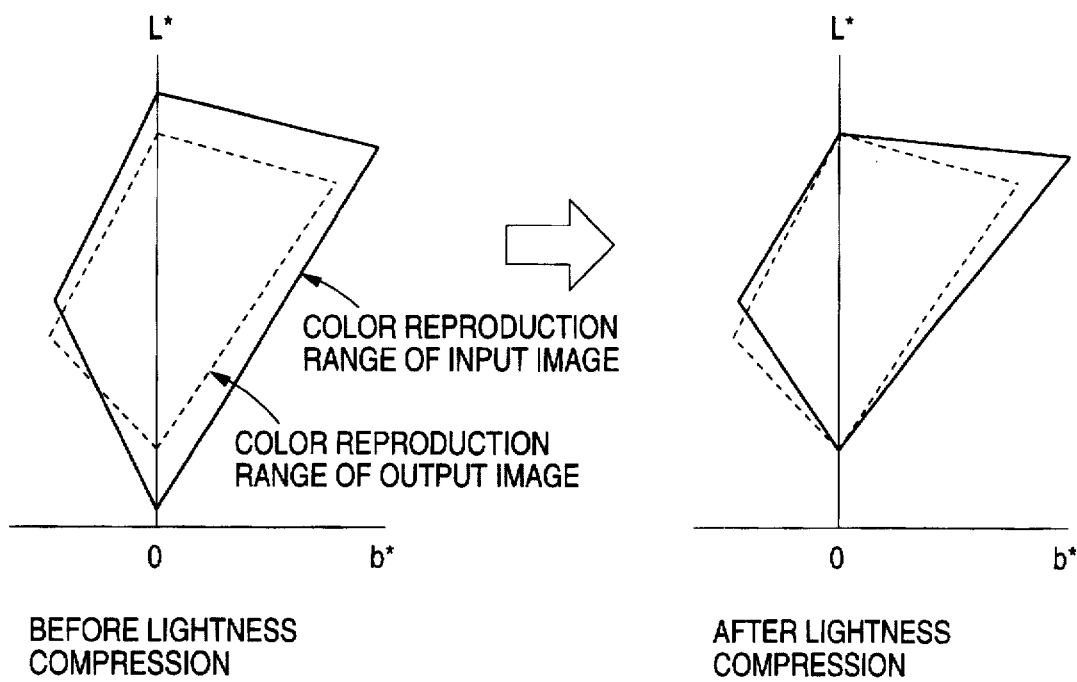
FIG. 3 shows states before and after lightness compressed.
FIG. 4 shows a specific structure of a compression direction table.

FIG. 1 shows a configuration of an image processing apparatus according to an embodiment of the present invention. FIG. 2 is a block diagram showing a color reproduction range judging and L*a*b* compressing section. FIG. 3 shows states before and after lightness compression, and FIG. 4 shows a specific structure of a compression direction table.

In FIG. 1, an image input device 1 is a personal computer, an image reader or the like which forms image on a CRT display and takes the image signals of the three primary color i.e., B (blue), G (green) and R (red). A color conversion section 2 inputs BGR image signals from the image input device 1 and converts the input BGR image signals to the lightness signal L* and the chroma signals a* and b*. A color reproduction range judging and L*a*b* compressing section 3 receives L*a*b* signals, and judges whether the input signals are located inside or outside the color reproduction range. If the input signals are located outside the color reproduction range, the signals are subject to a required compression processing and are converted to L*'a*'b*'. A DLUT and interpolation computing section 4 receives the color signals L*'a*'b*', converts the input color signals L*'a*'b*' to toner signals of Y (yellow), M (magenta), C (cyan), and K (black) which are used as output image signals suitable for the output device, and performs interpolation computation on the color converted signals. The color conversion is executed by use of a direct look-up table (DLUT). The DLUT and interpolation computing section 4 retrieves lattice point data including several close points while setting the 4 upper bits of compressed color signals L*'a*'b*' as a base address signal to refer to the lattice point, and performs interpolation computation using the lower 4 bits. For example, "Display and Imaging" (in Japanese), SCI. Vol. 2, No. 1, pp. 17–25, 1993 describes a method for executing cubic interpolation while referring the close eight points, a method for executing prism interpolation while referring the close six points, and a method for executing tetrahedron interpolation while referring the close four points or the like. An image output device 5 receives the thus obtained YMCK signals and outputs a visualized image. As the output image signals, not only YMCK signals but also signals for three colors of YMC may be used. In a case where a CRT is used as an output device, any color signal for BGR or the like may be used.

The color reproduction range judging and L*a*b* compressing section 3 has such construction as shown in FIG. 2. L* compressing section 31 recognizes lightness signal in previously input image signals and equally compresses the lightness signal in L*-axis direction if a low lightness portion or a high lightness portion of the input image signals is located outside the color reproduction range for the lightness axis of the image output device. FIG. 3 shows states before and after the compression in the color space (L*-b* plane). Thus, when only lightness compression is performed, a region may still exist outside the color reproduction range. A closest lattice point address generating section 32 retrieves a closest lattice point from several close points which are referred to by the upper 4 bits of the lightness compressed image signals L*a*b* by using the lower 4 bits, whereby an address of a compression direction table 33 is generated.

In the compression direction table 33 according to the present embodiment, the data length of the compression direction table 33 is 2 bits. Data "0" indicates inclusion in the color reproduction range, data "1" indicates compression toward low lightness in the lightness direction, data "2" indicates compression toward high lightness in the lightness direction, and data "3" indicates compression in the chroma direction. If this compression direction table 33 corresponds to the DLUT lattice points for the image output device as shown in FIG. 4, it can be dealt with a part of the DLUT lattice points.

A color reproduction range judging section 34 judges whether compression is executed or not by data of the compression direction table of a closest lattice point read out from the compression direction table 33, sends 2-bit compression direction information in the lightness direction or in the chroma direction to a quadrant judging and inclination judging section 35, if the compression is executed, and sends 1-bit color reproduction range inside/outside judgment information to other processing sections (not shown). The 1-bit color reproduction range inside/outside judgment information is used to display on, for example, a display as the results of the color reproduction judgment.

The quadrant judging and inclination judging section 35 sends the output image signals L*a*b* to a color reproduction range outermost lattice point detecting section 36 and also sends a retrieval direction control signal to the color reproduction range outermost lattice point detecting section 36. If the compression is executed in the lightness direction, the retrieval direction control signal is in the only L* direction, or if the compression is executed in low lightness direction, high light direction or chroma direction, the retrieval direction control signal is caused to approach gray axis (L* axis) without changing the hue.

The color reproduction range outermost lattice point detecting section 36 performs tracing in the retrieval direction with a unit movement that is approximately equal to the lattice point interval of the DLUT using the retrieval direction control signal. If the compression direction indicated by the retrieval direction control signal corresponds to the lightness, increment or decrement is executed in the retrieval direction on the higher 4 bits of the signal L* that is to become a L* address signal, and the next retrieval is carried out. If the compression direction is the chroma direction, compression is selectively executed on the signals L*a*b, based on said quadrant signal. When the compressed signals L*a*b* reach the inside of the color reproduction range, the signal value may be output as L*', a*', b*'.

Selectors 37 and 38 switch data to retrieve the color reproduction range while referring the compression direction data 33 at the closest lattice point address generating section 32 and repeating the color reproduction range inside/outside judgment. Further, the selectors 37 and 38 finish the retrieval when the signals L*a*b* reach the color reproduction range in the color reproduction range outermost lattice point detecting section 36. If the signals L*', a*', b*' obtained from the color reproduction range outermost lattice point detecting section 36 is output from the selector 38 to the DLUT, a clip of the color reproduction range to the outermost position can be carried out while maintaining the hue.

Figure 5:
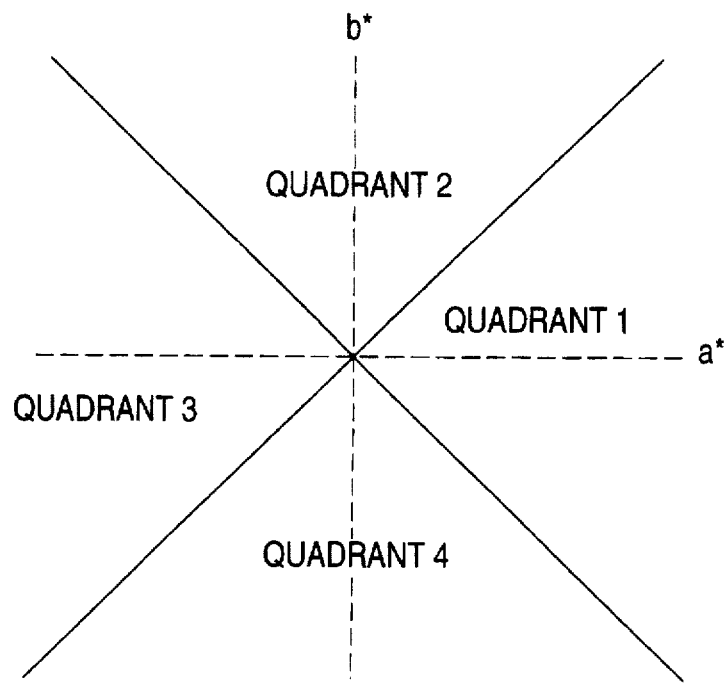
FIG. 5 illustrates how a quadrant judgment is performed.
Figure 6:
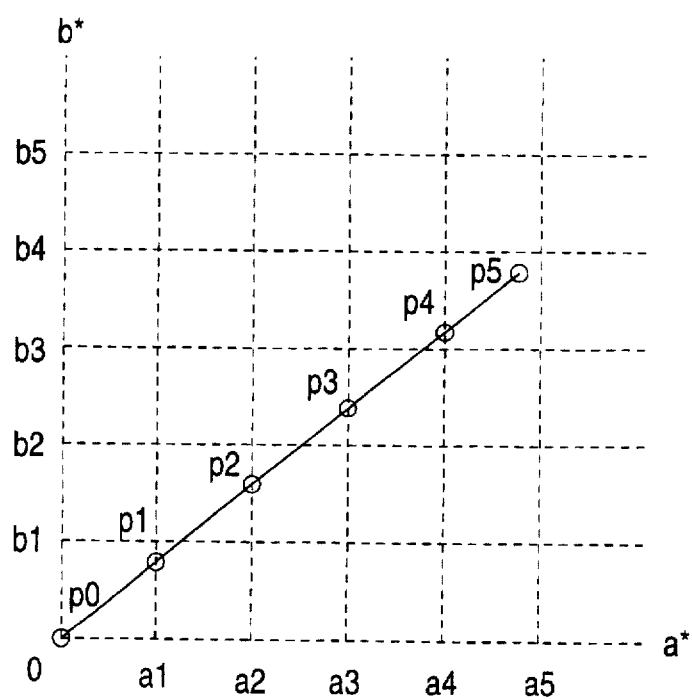
FIG. 6 shows an example of compression processing in the chroma direction.

FIG. 5 illustrates how a quadrant judgment is performed, and FIG. 6 illustrates an example of compression processing in the chroma direction.

When the compression is performed in the chroma direction, the quadrant judging and inclination judging section 35 performs a quadrant judgment, and sends resulting quadrant information to the color reproduction range outermost lattice point detecting section 36 as a retrieval direction signal. In this case, the quadrant judgment is executed as shown in FIG. 5. In FIG. 5, the point of intersection of axes a* and b* indicates achromatic color (a* =b* =0). Further, the quadrant judgment is performed according to the following formulae.

Quadrant 0: a*=b*=0
Quadrant 1: $-a^* \leq b^*$ and $a^* > b^*$
Quadrant 2: $a^* \leq b^*$ and $-a^* < b^*$
Quadrant 3: $-a^* \geq b^*$ and $a^* < b^*$
Quadrant 4: $a^* \geq b^*$ and $-a^* > b^*$ When the compression direction is the chroma direction, input signals L*a*b* are output as L*'a*'b*' with no alteration when they are located in quadrant 0. Otherwise, a segment connecting a point (a*, b*) to the point (0, 0) which is on the gray axis is formed, in accordance with the above-mentioned quadrant judgment in the color reproduction range outermost lattice point detecting section 36. Actually, it is sufficient to discretely retain intersecting points of this segment and the a* or b* direction lines of the mesh constituting the DLUT lattice points. The a* or b* direction is selected from said quadrant. The quadrant 1 and quadrant 3 may use the point of intersection with a DLUT lattice mesh determined by b* and the quadrant 2 and quadrant 4 may use the point of intersection with a DLUT lattice mesh determined by a*. An actual example will be described with reference to FIG. 6.

In FIG. 6, a point (a*, b*)=(0, 0) is defined as the origin (PO) and the input (a*, b*) is defined as a point P5. The point P5 is recognized as a point which belongs to quadrant 1 by using the above formulae. Thus, it is supposed that the closest lattice point to P5 is (a5, b4) and to execute a chroma direction compression has been found by referring the data of the compression direction table. The point (a*, b*) is shifted to a point P4 which is a point of intersection of a*=a4, and refers the data of the compression direction table from the closest lattice point (a4, b3) in the same way as in the previous time, so that a judgment of the presence or absence of compression and a judgment of the compression direction if the compression is required, are carried out. Such operations are fed back from the selector 38 to the selector 37 to repeat. When the compression is not required, the operation is finished. Signals L*'a*'b*' are output from the color reproduction range outermost lattice point detecting section 36 through the selector 38. Of course, L*-direction compression may be used in this procedure. Consequently, the chroma can be projected to the color reproduction range outermost lattice point detecting section 36 without changing the hue by the above-mentioned operations.

Embodiment 2

Figure 7:
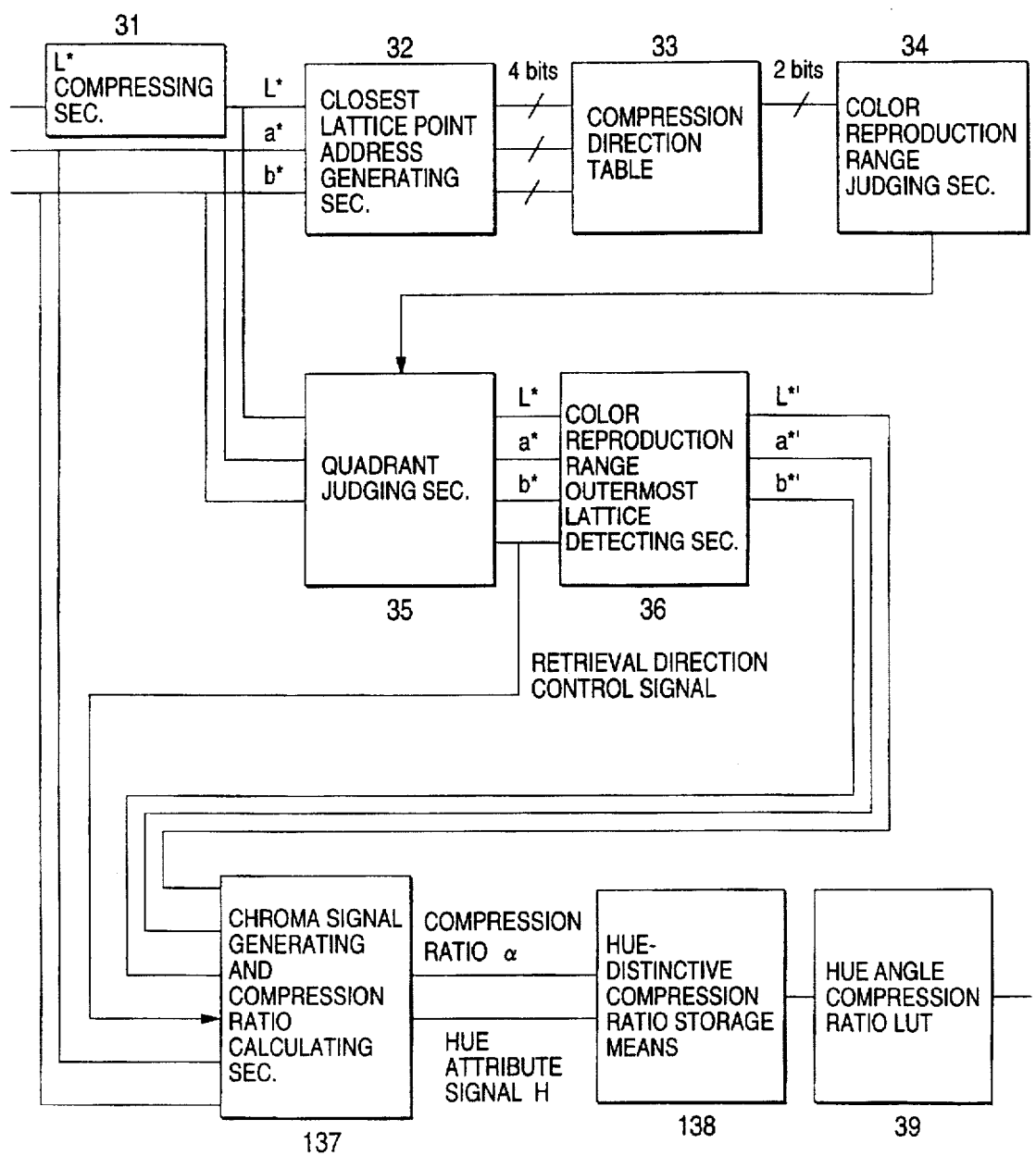
FIG. 7 is a block diagram showing an image processing apparatus according to a second embodiment of the invention.
Figure 8:
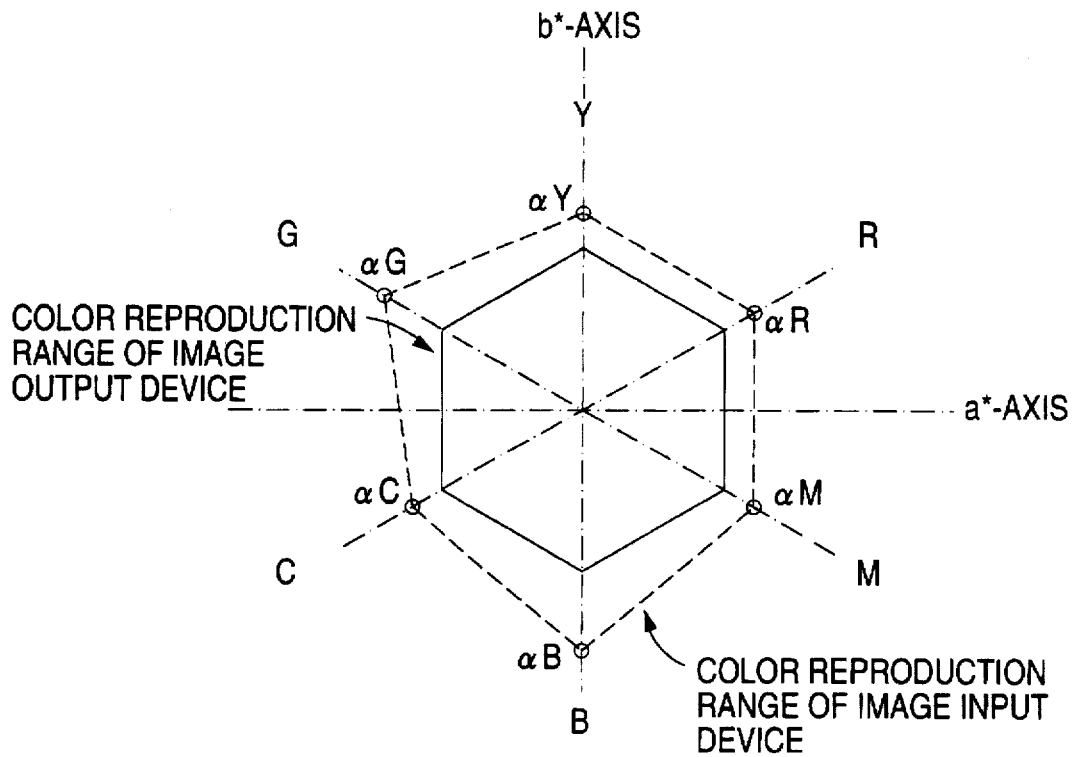
FIG. 8 is a schematic diagram showing a color reproduction range.
Figure 9:
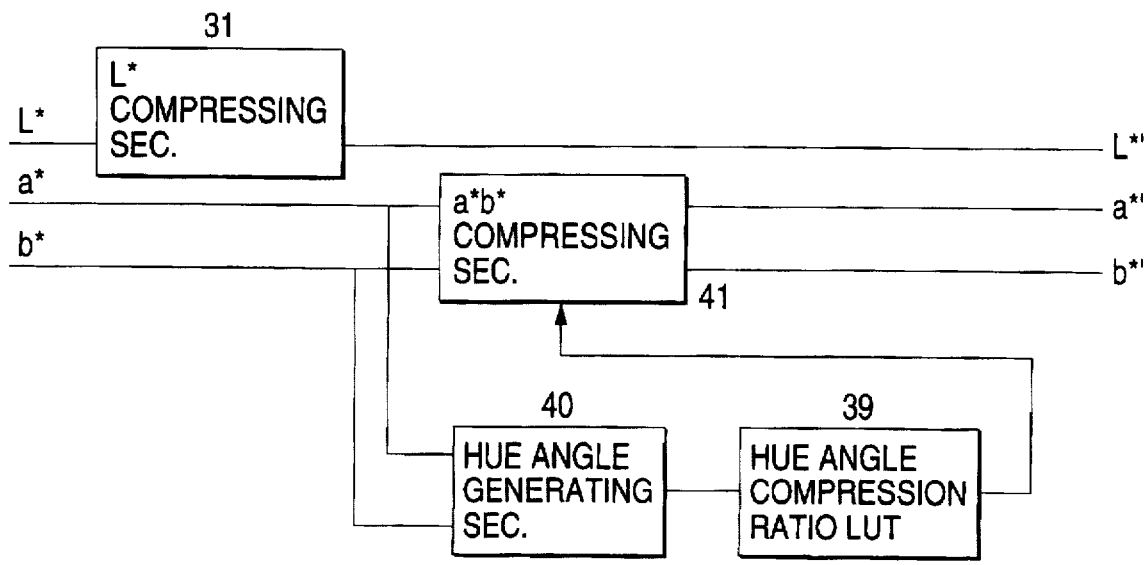
FIG. 9 is a block diagram showing a configuration of a color reproduction range judging and L*a*b* compressing section.

FIG. 7 shows an image processing apparatus according to a second embodiment of the invention. FIG. 8 is a schematic diagram showing a color reproduction range, and FIG. 9 is a block diagram showing a color reproduction range judging and L*a*b* compressing section.

In this embodiment, a construction for performing non-deformed reproduction with compression in the chroma direction will be described. In order to perform such compression, the shape of the color reproduction range of an input image must be previously known. Therefore, prior to actual processing, the shape will be investigated and memorized. The hues in this embodiment are divided into six hues of B, G, R, Y, M, and C, so that it is memorized how much the shapes of the divided hues are larger than the color reproduction range of the output device. The divisional way of this hues is optional. If the divisional way of the hues is the same as in the quadrant judging section 35 for example, the hues are easily divided. On the contrary, if the hues are small divided, the shape of the color reproduction range can be precisely obtained.

The way of obtaining a schematic shape of the color reproduction range of the input image will be hereinafter described in detail with reference to FIG. 7. A L* compressing section 31, a closest lattice point address generating section 32, a compression direction table 33, a color reproduction range judging section 34, a quadrant judging section 35, and a color reproduction range outermost lattice point detecting section 36 are the same as shown in embodiment 1. A retrieval direction signal from the quadrant judging section 35, input signals a*b*, and signals a*b* from color reproduction range outermost lattice point detecting section 36 are sent to a chroma signal generating and compression ratio calculating section 137. Only when the retrieval direction control signal is a chroma direction, a chroma signal C* is generated from signals a*b*, compression ratio α=C*/C*' is calculated, and also the hue attribute signal H is generated from the signals a*b*. In the hue attribute signal H, it has been judged from the signals a*b* that to which one of the hues of B, G, R, Y, M and C the retrieval direction control signal belongs. In a hue-distinctive compression ratio storage means 138, the compression ratio for the hue attribute signal H is compared with a memorized compression ratio for the same hue as in the signal H. If the compression ratio is smaller than the compression ratio α, the compression ratio is renewed to α. In this case, when the minimum value is preserved, danger which leads to entire deterioration of the chroma always arises due to data of high chroma. Accordingly, the following processing is preferable. Namely, a plurality of minimum values are preserved and an average or a median is selected, or a histogram is formed and the maximum is appropriately determined from the shape or referring the peripheral pixels a smoothing processing is used. The initial-value of the hues of B, G, R, Y, M and C is set to 1. The purpose of this processing is to determine the shape of the color reproduction range of an input image. Therefore, it is not necessary to process all pixels of the input image, and it is efficient to select pixels so that they cover the whole input image on the average. In a case where a compression ratio of the color reproduction range is represented by one hue surface, to remove data having comparatively high lightness and low lightness is also effective to obtain an appropriate compression ratio. For this reason, a signal L*' is referred in the chroma signal generating and compression ratio calculating section 137.

Thus, a schematic color reproduction range of an input image can be known. FIG. 8 is a schematic diagram showing a color reproduction range which is normalized by the compression ratio α. The color reproduction range of the image input device represents the whole hues with six points of αY, αR, αM, αC, and αG. When the hue is at a middle position, the compression ratio is calculated by a weighted mean from the compression ratio values of adjacent two points and the hue angle. If the weighted mean is calculated from the hue angle every time, the precision is preferable. Nevertheless, this calculation is not suitable for a processing which requires an actual time or speed. In this case, a look-up table may be formed by appropriately divide the hue angle and previously calculate compression. In this embodiment, division into 360 sections is executed. It is of course that the smaller this division is the more precise the compression ratio becomes. Thus, the compression ratio LUT 39 is formed by the hue angles.

In addition, if a compression ratio is determined for each lightness range, the compression ratio LUT 39 is formed by a plurality of hue angles, and the compression ratio is determined by the weighted averaging from the input lightness value L* and the compression ratios of two points that are adjacent to each other in the lightness direction of the same hue angle, compression can be performed precisely in consideration of a three-dimensional color reproduction range.

After the compression ratio LUT 39 is formed by the hue angles in said method, a compression processing of an actual input image is executed. The lowest lightness and the highest lightness, i.e., a white level and a black level is compressed into the color reproduction range of an image output device in only the lightness direction in L* compressing section 31 of FIG. 9. After the hue angle is calculated and quantized in a hue angle generating section 40, the compression ratio LUT 39 obtained by the hue angle is referred, thereby obtaining compression ratios. The chroma can be equally compressed by multiplying the compression ratio by a* and b* in a compressing section 41.

If a chroma compression using the compression ratio LUT obtained by the hue angle is executed while using the L*-direction compression formed by said compression direction table, color reproduction range judging section, quadrant judging section and color reproduction range outermost lattice detecting section (not shown), a good reproduction having non-deformation in the L* direction can be obtained.

Embodiment 3

Figure 10:
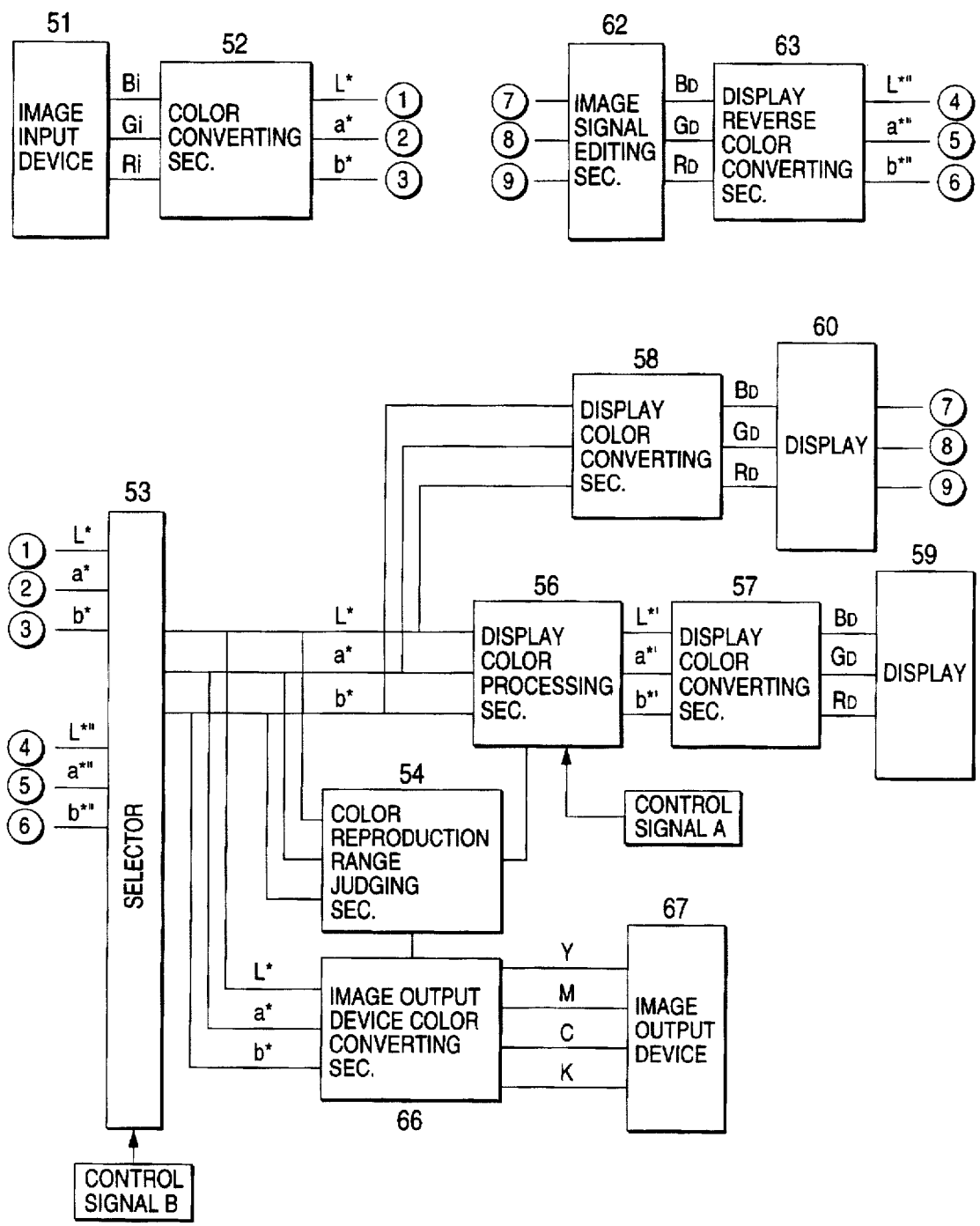
FIG. 10 is a block diagram showing an image processing apparatus according to a third embodiment of the invention.
Figure 13:
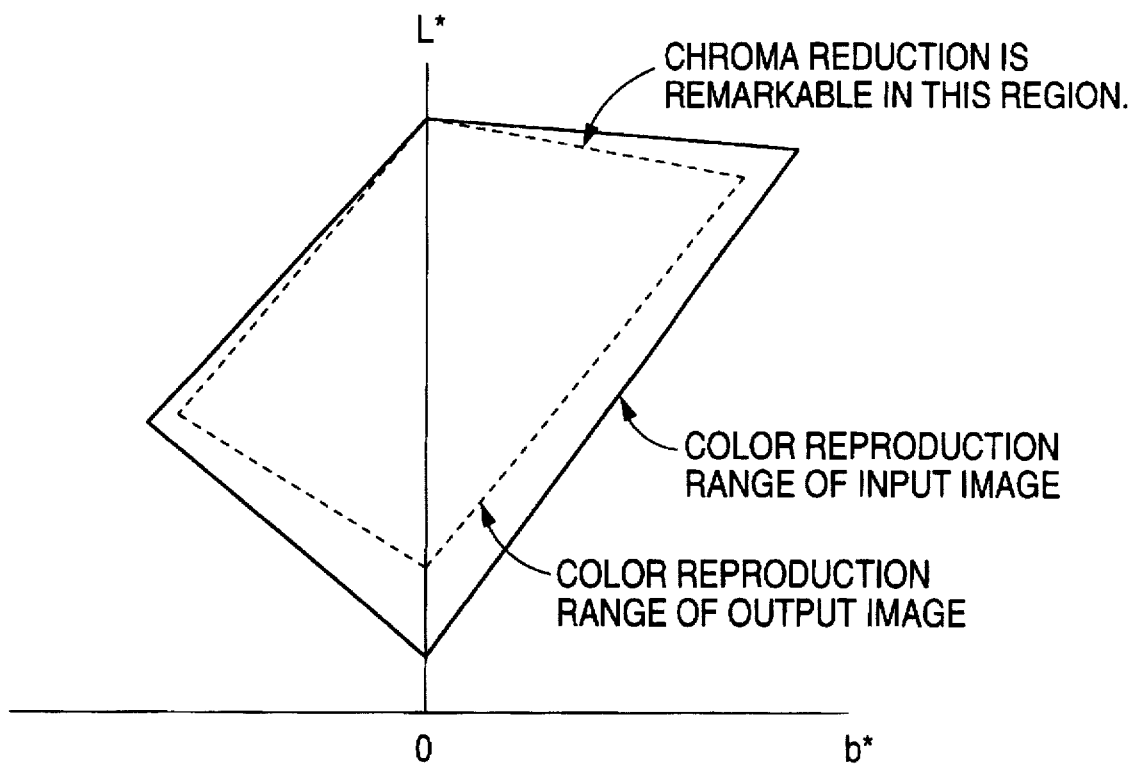
FIG. 13 illustrates a problem of chroma reduction due to compression in the chroma direction.

Next, another embodiment in which judgment results of the color reproduction range inside/outside information is output with a display and can be edited will be described. FIG. 10 is a block diagram showing an image processing apparatus according to a third embodiment of the invention, and FIGS. 11 and 12 show examples of structures of direct look-up tables (DLUTs).

As shown in FIG. 10, BGR image signals in input from an image input device 51 such as a computer or an image read device or the like to a color converting section 52 and converted to L*a*b, signals and sent to a selector 53. In the selector 53, a change of the input side to the output side is appropriately executed by a control signal determined by an operator's command. The L*a*b* signals input from an image input device 51 side are separated into a color reproduction range judging section 54 and a display color converting section 58. The display color converting section 58 converts the L*a*b* signals to color signals $B_D$, $G_D$, and $R_D$ for a display, and the L*a*b* signals are displayed on a display 60 by the color signals $B_D$, $G_D$, and $R_D$. On the other hand, the color reproduction range judging section 54 has information of the color reproduction range of an image output device 67 and judges whether or not the input signals L*a*b* exist within the reproduction range. If the input signals L*a*b* exist within the color reproduction range, a color reproduction flag for 0, and if it is not within the color reproduction range, a color reproduction flag for 1 are sent to a display color processing section 56. The display color processing section 56 serves to make the image region inside or outside the color reproduction range recognizable to an operator using the signals L*a*b* based on a control signal A determined by a command and a color reproduction range flag of the color reproduction range judging section 54. For example, when the control signal A is 0, no processing is executed, and when it is 1, the display of the image region outside the color reproduction range is inverted. Further, when it is 2, the image region outside the color reproduction range is erased by making it white. If it is 3, the image region inside the color reproduction is erased by making it white. A display color converting section 57 converts the thus processed signals L*', a*', b*' to color signals $B_D$, $G_D$, $R_D$, which are displayed on a display 59.

When the image obtained by the above-mentioned color signals is displayed on displays 59 and 60, an operator can easily find before actual output of images by comparing the images to each other which portions of input images are not faithfully reproduced in a case of output by an image output device 67. The display color converting sections 57 and 58 and the display 59 and 60 are seemingly shown by two respectively for convenience of the explanation. However, two images may be actually displayed on a display, and two images may be converted by the control signal A to display the images on a screen. Thus, if an operator can detect the image located outside the color reproduction range, a required edit with respect to the region outside the color reproduction range can be executed by an image signal editing section. In this embodiment, the edit is executed by using images obtained by the color signals $B_D$, $G_D$, $R_D$ in the display 60. Thus edited signals are converted to signals L*", a*", b*" by a display reverse color converting section 63 and fed back to a selector 53.

Therefore, when a processing to display images edited automatically or by an operator's instruction on the display 60 again is executed, a state of the outside of edited color reproduction range can also be confirmed. Consequently, if the operator satisfied the image, the operator instructs to convert the image to output image signals Y, M, C, K by using the image output device color converting section 66, so that a required output image can be obtained by an image output device 67. The above-mentioned image can be edited in the L*a*b* color space, which is not shown in a drawing.

As a color reproduction range judging section 54, the color reproduction range judging section 34 (see FIG. 2) is used. The 1-bit color reproduction inside/outside judgment information is sent to a display color processing section 56 as a color reproduction flag.

Lattice point data which is output values with respect to the image output device is usually received in the structure of DLUT as shown in FIG. 11. The lattice data corresponds to lattice addresses. Nevertheless, when 1 bit color reproduction range judging flag is added to 32 bits of Y, M, C, K which are previously memorized in lattice points as shown in FIG. 12, the color reproduction range flags of the closest lattice point for the input values of signals L*, a*, b* may be referred in the color reproduction judgment. Further, the reproduction range judging flag is extended to 2 bits, and the reproduction range judging flag is previously set in accordance with deviation degree from the color reproduction range. Thus, the deviation degree can be caused the operator to know. The set of flags is carried out as follows. For example, if the extended flag is within the color reproduction range, the flag is set as 0, if the color difference is within about 10, the flag is set as 1, if the color difference is within about 20, the flag is set as 2, if the color difference is within about 30, the flag is set as 3 or the like. This information may be used when the compression of the color reproduction range is executed. Thus, the values of color difference and the bit length of the color reproduction judging flag can be set arbitrarily.

The invention is not limited to the above embodiments but various modifications are possible. For example, although the above embodiments are directed to the image output device using the four colors of Y, M, C and K, the invention can also be applied to an image output device using three colors of Y, M and C or three colors of B, G and R (as in a CRT display). In the above embodiments, each of the signals B, G, R, Y, M, C, K, L*, a* and b* is described as an 8-bit signal and the DLUT is described as a 4-bit table. However, they may be a signal or table of any bits. Further, it goes without saying that color spaces other than L*a*b* can be used without causing any problem.

Further, in the above embodiments, the lower 4 bits of the signals L*a*b* are used to retrieve the closest lattice point from the eight points that are close to the signals L*a*b*. To obtain the same effects, one-dimensional look-up table of 8 bits for each of L*, a* and b* may be used. Although the precision is decreased a little, only the upper 4 bits may be used as a close lattice point address. Thus, the configuration of the color reproduction range judging section can be simplified.

As explained above, according to the present invention, the binary data corresponding to the respective lattice point data addresses of the direct look-up table and indicating the inside or outside of the color reproduction range of an output device is retained, and a judgment of whether the input color signals are located inside or outside the color reproduction range is performed based on the binary information. A lattice point data address which is generated from the input color signals is compressed, and a color conversion suitable for the output device is executed based on the lattice point data address that is located inside the color reproduction range by using the direct look-up table. As a result, there can be provided an image processing apparatus which can produce a good output image from the input color signals.

Further, even if the color reproduction range is a complicated shape, a direct look-up table is used. Therefore, the inside and outside of a color reproduction range can be precisely known. Further, since a complicated processing is not required, a high speed processing can be executed. Furthermore, in the present device, a processing of an image output device color conversion DLUT can be acted and a gamut alarming mechanism having a small programming scale or hardware scale can be obtained.

What is claimed is:

1. A color image processing apparatus that converts the color of an input color image to a color suitable for an output device by using a direct look-up table, comprising:

color converting means for converting an input color signal into a second color signal in an intermediate color space;

judging means including:

means for generating a representative lattice point data address corresponding to the second color signal, said representative lattice point data address corresponding to an entry in the direct look-up table having both binary data indicating whether the lattice point data is inside or outside of a color reproduction range and direction data indicating a compression direction in said intermediate color space, and inside/outside judging means for judging whether the representative lattice point data address is located inside or outside the color reproduction range of the output device based on the binary data; and compression means for compressing the representative lattice point data address based on the direction data when the inside/outside judging means determines that the representative lattice point data address is located outside the color reproduction range of the output device, the compression means including a color reproduction range outermost lattice point detecting section, wherein the judging means and the compression means repeatedly generate lattice point data addresses located inside the color reproduction range of the output device.

2. The color image processing apparatus according to claim 1, wherein the judging means has means for analyzing multi-value data that correspond to the representative lattice point data addresses of the direct look-up table and indicate whether said representative lattice point data are inside or outside of the color reproduction range of the output device.

3. The color image processing apparatus according to claim 1, wherein the compressing means performs projection to an outermost portion of the color reproduction range.

4. The color image processing apparatus according to claim 1, wherein the compressing means compresses the lattice point data address into the color reproduction range based on the binary data.

5. The color image processing apparatus according to claim 1, wherein the compressing means divides the color reproduction range of the output device into respective hue ranges, stores representative compression ratios of the respective hue ranges, calculates a compression ratio of each point based on the representative compression ratios, to thereby perform the compression into the color reproduction range.

* * * * *